United States Patent
Topopolsky et al.

[15] 3,703,114
[45] Nov. 21, 1972

[54] DEVICE FOR REMOVING FLASH FROM SEAMS OF BUTT-WELDED LONG-MEASURE ARTICLES

[72] Inventors: Yankel Meerovich Topopolsky; Mark Aronovich Shikhman, both of Kiev, U.S.S.R.

[73] Assignee: Vsesojuzny proekthno-konstruktorsky institut svarochnogo proizvodstva, Kiev, U.S.S.R.

[22] Filed: Feb. 10, 1971

[21] Appl. No.: 114,117

[52] U.S. Cl. .............................83/3, 83/914, 90/24 E
[51] Int. Cl. ................................................B26d 3/06
[58] Field of Search..83/3, 914; 90/24 A, 24 C, 24 E, 90/24 F

[56] References Cited

UNITED STATES PATENTS

| | | | |
|---|---|---|---|
| 2,945,117 | 7/1960 | Harris et al. | 83/914 X |
| 3,134,012 | 5/1964 | Neukon et al. | 83/914 X |
| 3,399,585 | 9/1968 | Ahlert | 83/3 |
| 3,597,958 | 8/1971 | Gross | 83/914 X |

*Primary Examiner*—Donald R. Schran
*Attorney*—Holman & Stern

[57] ABSTRACT

The claimed device for removing flash from the seams of butt-welded long-measure articles includes a casing carrying a head with opening cutters, said head being installed with a provision for being moved progressively by its drive on a lever one end of which is articulated at the base of the casing and connected with the drive which turns said lever in a vertical plane for bringing the lever with the head to a working position parallel to the article.

3 Claims, 4 Drawing Figures

DEVICE FOR REMOVING FLASH FROM SEAMS OF BUTT-WELDED LONG-MEASURE ARTICLES

The present invention relates to equipment for machining butt-welded seams and more specifically to devices for removing flash from the seams of butt-welded long-measure articles, such as rolled stock or tubes welded by contact-arc welding machines.

The present invention can be utilized most successfully for removing flash from the seams of rails laid in rail track, though it can be used equally well for the same purpose while welding pipelines and repairing metal structural elements such as rolled structural steel, e.g., angles, channel iron, etc.

Widely known in the art are devices for removing flash from the seams of rails laid in rail tracks, comprising a casing fixed rigidly on the rail being welded and carrying a head with opening cutters which bear against that part of the article from which the flash is to be removed. In such devices, the head is connected rigidly with a drive for moving it along the axis of the welded article and is located inside the casing which latter is rolled on a truck to the working position for removing flash, said truck being placed on the rails being welded.

In these known devices the casing can be fixed on the rail only after welding it and withdrawing the machine from the welded joint.

Flash can be removed when the temperature of the joint is not under the forging temperature of metal, i.e., 750°C. In this case the machined surface has no cracks and dents. Depending on the welding conditions, the joint cools down in the course of 35 to 60 seconds. This means that flash must be removed not later than 35 seconds after the completion of welding, including the time required for taking the welding machine off the joint.

In view of the fact that the known devices require additional time for installing the casing with the cutter head in the zone of the joint, such devices remove flash within a period which is considerably longer than that stipulated by the flash-removal specifications.

In addition, while the casing is rolled to the working position, it must move over the non-machined joint which also involves an additional loss of time and, as a consequence, cooling of the joint below the allowable temperature. The rigid linkage between the cutter head and its motion drive calls for accurate alignment of both the head and the entire casing in relation to the joint which again requires additional time.

The main object of the invention resides in providing a device for removing flash with its head so arranged with respect to the casing that this device makes it possible to remove flash before the welded joint has had time to cool below the forging temperature of metal.

This object is achieved by providing a device for removing flash which includes a casing fixed rigidly on the article and carrying a head with opening cutters, which bear against that part of the welded article where flash is to be removed, said head being moved by the drive along the axis of the welded article in which, according to the invention, the cutter head can be moved progressively by its drive and is installed on a lever. One end of the lever is articulated at the base of the casing and is connected with the drive turning it in a vertical plane for bringing said lever with the cutter head to the working position, parallel to the article. The lever passes through a hole in the cutter.

Such an arrangement in which the cutter head is installed outside of the casing allows the latter to be fixed on the rail before the end of welding so that flash can be removed from the seams while they have not yet had time to cool below the forging temperature of metal.

It is preferred that the drive for moving the head with relation to the lever should be articulated to it by rods and that a spring should be provided on the lever between the casing and head, said spring being compressed during the working travel of the head towards the casing, and returning the head to the initial position after removal of flash.

This ensures self-alignment of the cutter head with relation to the article at the moment of flash removal and allows the lever with the head to be turned from the working to the travelling position.

The claimed device ensures efficient removal of flash with minimum allowances for subsequent grinding, steps up output four times as compared with the use of pneumatic chisels and dispenses with the necessity of digging a ditch under the welded joint, said ditch giving access to the rail foot for manual cutting of flash.

Now the invention will be described in detail by way of example with reference to the accompanying drawings in which.

The following is a description of the device for removing flash from the joints of the rails welded by a portable rail-welding machine and laid in a track.

Figure 1:
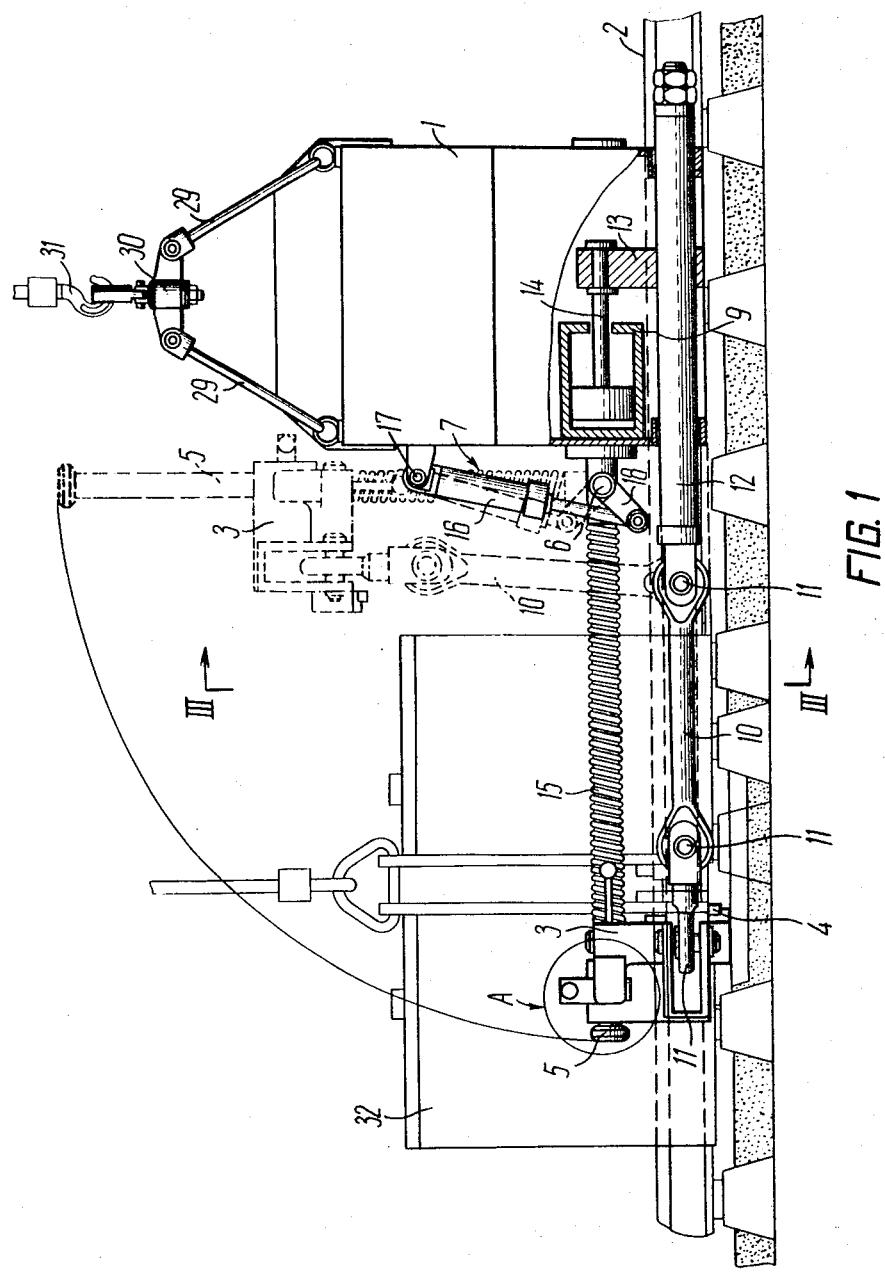
FIG. 1 is an elevational view of the device according to the invention, partly cut-away.
Figure 2:
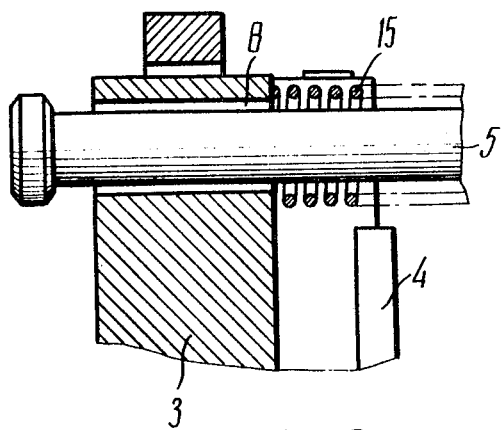
FIG. 2 is a sectional view of fragment A in FIG. 1.

This device includes a casing 1, as shown in FIG. 1, fixed with relation to the rail 2, a head 3 with cutters 4, installed on a lever 5. The cutters bear against the rail 2 around the entire perimeter thus removing flash simultaneously from the whole joint. The lever 5 is secured by a hinge 6 at the base of the casing 1 and is turned by a mechanism 7 around this hinge together with the head 3 in a vertical plane for bringing said head from the travelling to the working position parallel to the article, the travelling position of the lever 5 with the head 3 being shown by broken lines in FIG. 1. Being mounted on the lever 5, the head can be moved by its drive along the lever axis. For this purpose the head 3 has a hole 8 (FIG. 2) for the passage of the lever 5 whose cross section is smaller than the diameter of this hole. The head 3 is moved along the rail 2 by hydraulic cylinders 9 (FIG. 1) located on both sides of the rail 2.

Figure 3:
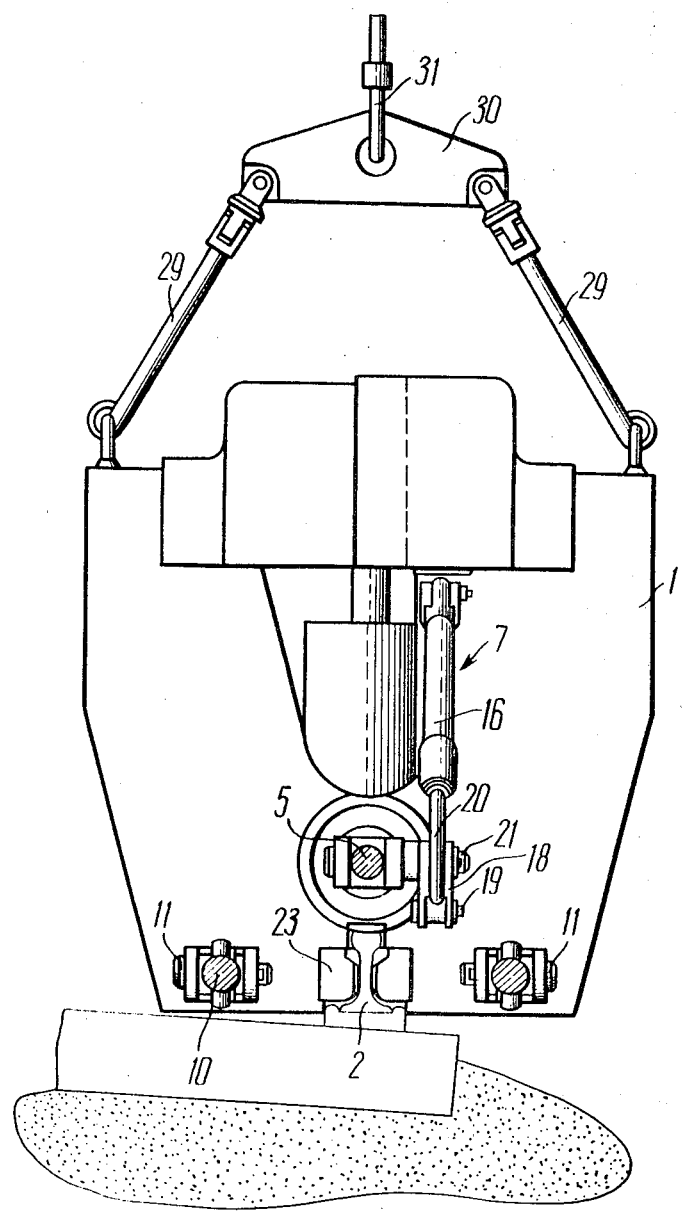
FIG. 3 is a section taken along line III—III in FIG. 1.

The head 3 is connected with said cylinders by parallel rods 10 (FIG. 3), each of which is connected by a link 11 with said head at one side while at the other side it is connected with a rod 12 (FIG. 1) fastened by a crosspiece 13 to the rod 14 of the hydraulic cylinder 9.

Coiled around the lever 5 between the casing 1 and the head 3 is a spring 15 which is compressed during the working motion of the head towards the casing and designed to return the head to the initial position after removal of flash. The mechanism 7 for turning the lever 5 comprises a hydraulic cylinder 16 secured by a hinge 17 to the casing 1, and a crank 18 connected by a hinge 19 (FIG. 3) with the rod 20 of the hydraulic cylinder 16. The crank 18 is secured on the shaft 21 which carries the lever 5.

Figure 4:
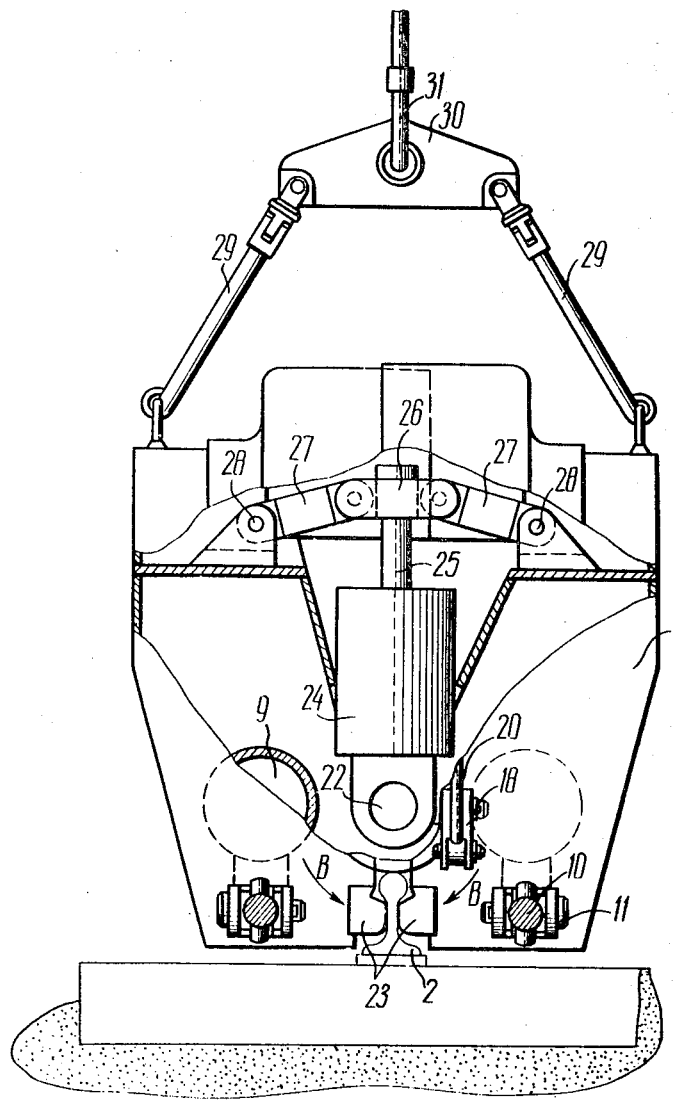
FIG. 4 shows a mechanism for fixing the casing of the device on the article.

The casing 1 includes two halves as shown in the FIG. 4, these halves being interconnected by a pivot 22.

The casing is fixed on the rail 2 with the aid of a mechanism having jaws 23 secured, each on the corresponding half of the casing, and a hydraulic cylinder 24 the body of which is installed on the pivot 22 while the rod 25 is connected by a crosspiece 26 with the levers 27 which are fastened by hinge 28 to the corresponding halves of the casing 1.

The casing 1 is secured by rods 29 and shackle 30 to the hook 31 (FIG. 1) of a trolley hoist (not shown) for placing it in the zone of the welded joint.

The device operates as follows:

The rail-welding machine 32 (FIG. 1) is placed by an electric trolley hoist on the rail joint to be welded.

Simultaneously, another electric trolley hoist places the flash-removing device on one of the welded rails, side by side with the welding machine, the lever and cutter head 3 of the device occupying a vertical position. When oil is fed into the above-piston space of the hydraulic cylinder 24 (FIG. 4), the rod 25 retracts and, acting via the crosspiece 26 and levers 27, turns both halves of the casing 1 around the pivot 22, fixing the casing on the rail with the aid of the jaws 23. Turning of the casing halves is shown in FIG. 4 by arrow B. After fixing the casing on the rail, the rail ends clamped in the jaws of the rail-welding machine 32 are welded; after welding, said machine 32 is moved sidewise by the hoist thus leaving room on the rail for the cutter head 3 (FIG. 1). The hydraulic cylinder 16 operated from the control desk (not shown) turns the lever by the crank 18 from the vertical to the horizontal position. This lowers the head 3 onto the rail beyond the welded joint.

While the head 3 is being lowered, the spring 15 extends, moving said head along the lever 5, towards its free end. The rods 10 then come to a horizontal position.

After the head has been lowered onto the rail, the cutters 4 are closed manually so as to fit around the entire perimeter of the rail, thus forming a die with a profile which is equidistant from the profile of the rail.

On command from the control desk the hydraulic cylinders 9 move their rods 14 and the latter, acting via the crosspieces 13, rods 12 and 10, move the head 3 along the rail 2, thus cutting off flash. After removing the flash, the cutters 4 of the head 3 are opened manually, the hydraulic cylinders 9 return the head 3 to the initial position, the hydraulic cylinder 16 turns the lever 5 to the vertical (travelling) position after which oil is fed into the under-piston space of the hydraulic cylinder 24. As a result, the rod 25 extends and turns both halves of the casing 1 around the pivot 22 opposite to the direction of arrow B thus opening the jaws 23. Then the device is lifted off the rail 2 by an electric trolley hoist and can be placed near the next joint to be welded.

What is claimed is:

1. A device for removing flash from the seams of butt-welded long-measure articles such as rolled stock or tubes, comprising a casing of said device; a means for rigid fixing of said casing on the welded article; a lever articulated by one end of the base of said casing; a head with opening cutters, installed on said lever with a provision for being moved progressively along said lever; said cutters bearing against that part of the welded article from which flash has to be removed; a means for moving said head over said lever along the axis of the welded article for removing flash by said cutters; and means for turning said lever together with said head about the articulation from a travelling position in the vertical plane to a working position parallel to the article.

2. A device according to claim 1 wherein the lever passes through a hole in the cutter head.

3. A device according to claim 1, wherein the means for moving the head with relation to the lever is articulated to said head by rods and wherein there is a spring slipped on the lever between the casing and the head, said spring being compressed during the working motion of the head towards the casing and intended to return the head to the initial position after the removal of flash.

* * * * *